United States Patent
Sekine (10) Patent No.: US 12,042,993 B2
(45) Date of Patent: Jul. 23, 2024

(54) METHOD OF MANUFACTURING THREE-DIMENSIONALLY SHAPED OBJECT, AND ADDITIVE MANUFACTURING APPARATUS

(71) Applicant: CANON KABUSHIKI KAISHA, Tokyo (JP)

(72) Inventor: Shinsuke Sekine, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/091,170

(22) Filed: Nov. 6, 2020

(65) Prior Publication Data
US 2021/0162671 A1 Jun. 3, 2021

(30) Foreign Application Priority Data
Nov. 29, 2019 (JP) ................. 2019-217176

(51) Int. Cl.
*B29C 64/295* (2017.01)
*B29C 64/118* (2017.01)
*B29C 64/364* (2017.01)
*B33Y 10/00* (2015.01)
*B33Y 30/00* (2015.01)

(52) U.S. Cl.
CPC .......... *B29C 64/295* (2017.08); *B29C 64/118* (2017.08); *B29C 64/364* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 10,328,637 B2 | 6/2019 | Nystrom et al. | |
| 2015/0183162 A1* | 7/2015 | Kuk | B29C 64/112 264/129 |
| 2016/0151982 A1* | 6/2016 | Sand | B29C 35/0805 264/308 |
| 2018/0015668 A1* | 1/2018 | Koskas | B29C 64/209 |
| 2018/0117836 A1* | 5/2018 | Reese | B29C 64/118 |
| 2019/0255765 A1 | 8/2019 | Takeyama et al. | |
| 2019/0255766 A1 | 8/2019 | Takeyama et al. | |

(Continued)

FOREIGN PATENT DOCUMENTS

| CN | 112008971 A | * 12/2020 |
|---|---|---|
| JP | 2005-335380 A | 12/2005 |

(Continued)

OTHER PUBLICATIONS

Notice of Reasons for Refusal in Japanese Application No. 2019-217176 (Sep. 2023).

*Primary Examiner* — Farah Taufiq
(74) *Attorney, Agent, or Firm* — Venable LLP (57) ABSTRACT

A method of manufacturing a three-dimensionally shaped object includes stacking layers on a stage for manufacturing the three-dimensionally shaped object by repeating forming a desired-shape layer while moving a nozzle that injects molten thermoplastic resin. The nozzle moves while locally heating a front area and a side area by using a heating portion. The front area is located in front of the nozzle in a moving direction of the nozzle in a plan view of the stage. The side area is located beside the nozzle in the moving direction in the plan view.

8 Claims, 10 Drawing Sheets

(56) References Cited

U.S. PATENT DOCUMENTS

| | | | | |
|---|---|---|---|---|
| 2019/0263066 A1* | 8/2019 | Nystrom | ............... | B29C 64/118 |
| 2020/0298509 A1* | 9/2020 | Takai | ..................... | B29B 13/022 |
| 2020/0361149 A1* | 11/2020 | Arao | ..................... | B29C 64/393 |
| 2021/0231301 A1* | 7/2021 | Hikmet | ................... | F21V 29/74 |
| 2022/0134662 A1* | 5/2022 | Beetz | ................... | B29C 64/209 |
| | | | | 425/162 |

FOREIGN PATENT DOCUMENTS

| | | |
|---|---|---|
| JP | 2010-521339 A | 6/2010 |
| JP | 2017-206011 | 11/2017 |
| JP | 2017-206011 A | 11/2017 |
| JP | 2019-084814 | 6/2019 |
| JP | 2019-084814 A | 6/2019 |
| JP | 2019-142147 | 8/2019 |
| JP | 2019-142147 A | 8/2019 |
| JP | 2019-142148 | 8/2019 |
| JP | 2019-142148 A | 8/2019 |
| JP | 2019-142149 A | 8/2019 |
| JP | 2019-142150 A | 8/2019 |
| JP | 2019-524511 | 9/2019 |
| JP | 2019-524511 A | 9/2019 |
| WO | 2008/112061 A1 | 9/2008 |
| WO | 2018/039261 A1 | 3/2018 |

* cited by examiner

METHOD OF MANUFACTURING THREE-DIMENSIONALLY SHAPED OBJECT, AND ADDITIVE MANUFACTURING APPARATUS

BACKGROUND OF THE INVENTION

Field of the Invention

The present invention relates to a fused deposition modeling that forms a three-dimensionally shaped object by melting and extruding thermoplastic resin and depositing the resin, and to an additive manufacturing apparatus used for the modeling. In particular, the present invention relates to a technology that improves mechanical strength and rigidity of three-dimensionally shaped objects.

Description of the Related Art

In recent years, so-called 3D printers are increasingly developed, and various methods are being tried for the development. For example, there are known methods such as powder depositing-and-melting method, stereolithography that uses photo-curable resin, and fused deposition modeling.

The powder depositing-and-melting method forms a three-dimensionally shaped object by repeating a process to spread material powder of nylon resin, ceramic, or metal, so as to form a layer of the powder, and a process to selectively melt a portion of the powder layer by irradiating the portion with a laser beam. The powder depositing-and-melting method is also called the SLS method. Recently, for manufacturing products required to have high mechanical strength and good thermal conductivity, a powder depositing-and-melting method that uses metal powder as material powder comes into use.

The stereolithography is also called the SLA method, and forms a three-dimensional structure by repeating a process to selectively irradiate a photo-curable liquid resin with ultraviolet rays and form a cured layer.

The fused deposition modeling is also called the FDM method, and forms a three-dimensional structure by melting thermoplastic resin, extruding the material from a nozzle or the like, and depositing the material on a target portion for forming the three-dimensional structure.

As a specific example of the fused deposition modeling, Japanese Translation of PCT International Application Publication No. JP-2010-521339A discloses a method in which a filament made of a modified ABS (acrylonitrile-butadiene-styrene) is melted and extruded by using an extruding head. In this method, a 3D object is formed by forming one layer, obtained by slicing a CAD model, on another by using the extruding head.

In the method described in Japanese Translation of PCT International Application Publication No. JP-2010-521339A, the material is extruded through a nozzle of the extruding head, and deposited on a substrate such that the material forms a continuous line on an x-y plane. The extruded material fuses with the material of a lower layer that has already been deposited, and solidifies as the temperature decreases. Then, the position of the extruding head with respect to the substrate is raised along a z axis orthogonal to the x-y plane, and the next layer is formed. By repeating this process, the 3D object similar to the CAD model is produced.

In addition, Japanese Patent Application Publication No. 2005-335380 describes a technique for improving the adhesion strength of the layers. Specifically, when an object is formed by forming layers, an area which is just in front of the extruding head and to which the molten resin is to adhere is heated by using a laser, and then the surface of the molten resin extruded and deposited on the area is cooled by using cool air.

However, in the fused deposition modeling disclosed in Japanese Translation of PCT International Application Publication No. JP-2010-521339A, the material having already been deposited and the material extruded additionally after the deposition do not sufficiently fuse with each other. This is because the temperature of the material having already been deposited on the substrate has decreased when the next layer is formed, the material having already been deposited on the substrate is not in a melt state, and thus the adhesion between the material having already been deposited and the newly deposited material is often insufficient.

Thus, in three-dimensionally shaped objects formed by using the fused deposition modeling disclosed in Japanese Translation of PCT International Application Publication No. JP-2010-521339A, the adhesion in a planar direction and the adhesion between layers in a vertical direction are insufficient, and the mechanical strength is inferior to that of a molded product made through injection molding or the like.

In this point, Japanese Patent Application Publication No. 2005-335380 is intended to increase the adhesion strength in the vertical direction by heating the area which is just in front of the extruding head and to which the molten resin is to adhere, by using a laser when an object is formed by forming layers.

However, an area of the layer which is beside a position to which the molten resin is extruded and which has already been formed is not heated. Thus, if it takes time to form one layer, the temperature of the resin of the side area decreases significantly, and solidifies. As a result, sufficient adhesion strength cannot be secured, and the strength in the planar direction becomes insufficient.

Thus, in the fused deposition modeling, it has been desired to achieve a method and an additive manufacturing apparatus for manufacturing a three-dimensionally shaped object in which each layer has high adhesion strength in the direction parallel to the deposition plane and in the deposition direction perpendicular to the deposition plane, and which has high mechanical strength.

SUMMARY OF THE INVENTION

According to a first aspect of the present invention, a method of manufacturing a three-dimensionally shaped object includes stacking layers on a stage for manufacturing the three-dimensionally shaped object by repeating forming a desired-shape layer while moving a nozzle that injects molten thermoplastic resin. The nozzle moves while locally heating a front area and a side area by using a heating portion. The front area is located in front of the nozzle in a moving direction of the nozzle in a plan view of the stage. The side area is located beside the nozzle in the moving direction in the plan view.

According to a second aspect of the present invention, an additive manufacturing apparatus for manufacturing a three-dimensionally shaped object by stacking layers on a stage includes a nozzle and a heating portion. The nozzle is configured to inject molten thermoplastic resin while moving so that the layers are formed. The heating portion is configured to locally heat a front area and a side area. The front area is located in front of the nozzle in a moving direction of the nozzle in a plan view of the stage. The side area is located beside the nozzle in the moving direction in the plan view.

Further features of the present invention will become apparent from the following description of exemplary embodiments with reference to the attached drawings.

DESCRIPTION OF THE EMBODIMENTS

Hereinafter, a method of manufacturing a three-dimensionally shaped object of an embodiment of the present invention and an additive manufacturing apparatus used for the method will be described with reference to the accompanying drawings.

Note that in the drawings referred to in the below-described embodiments, a component denoted by an identical reference numeral has an identical function, unless otherwise specified.

Note that in the following description, the term "layer" means a portion formed by depositing molten thermoplastic resin once, in a case where a three-dimensionally shaped object is formed by depositing the molten thermoplastic resin more than once in a thickness direction. If the thermoplastic resin is deposited by an extruding head and a stage scanning each other in a relative manner, the term "layer" means a portion formed through a single scanning.

The interface between layers may be identified in the observation of a cross section of the three-dimensionally shaped object, but may not be clearly detected if the thermoplastic resin has high uniformity.

First Embodiment

Configuration of Additive Manufacturing Apparatus

Figure 1:
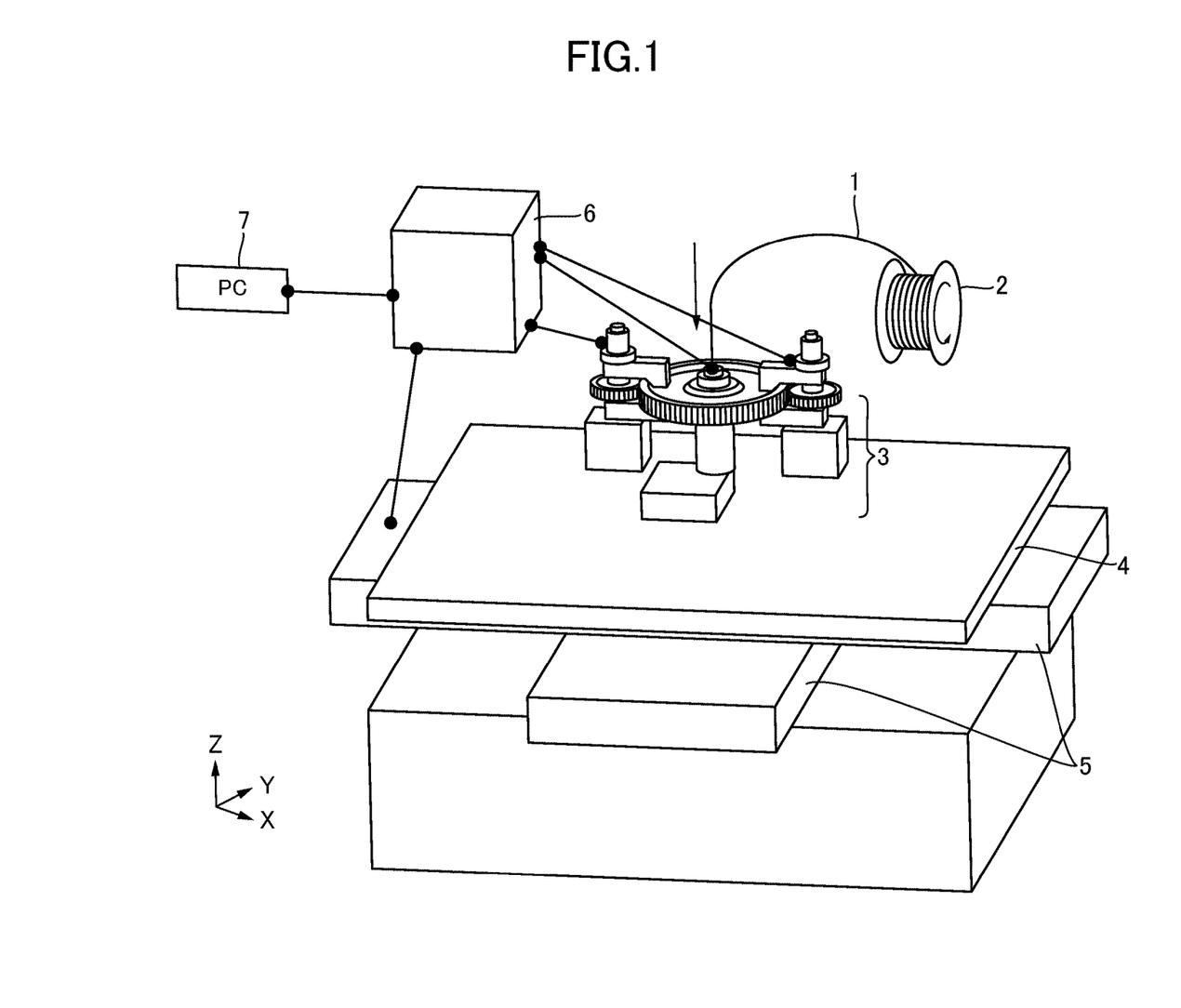
FIG. 1 is a schematic perspective view for illustrating an overall configuration of an additive manufacturing apparatus of a first embodiment.

With reference to FIG. 1, an overall configuration of an additive manufacturing apparatus of a first embodiment will be described. FIG. 1 is a schematic perspective view illustrating the configuration of the additive manufacturing apparatus.

In FIG. 1, a forming material 1, a reel 2, an extruding unit 3, a stage 4, a stage moving apparatus 5, a control unit 6, and a computer 7 are illustrated.

First, the extruding unit 3 will be described. Since the extruding unit 3 is a mechanism including many components, the configuration of the extruding unit 3 will be described with reference to FIG. 2.

Figure 2:
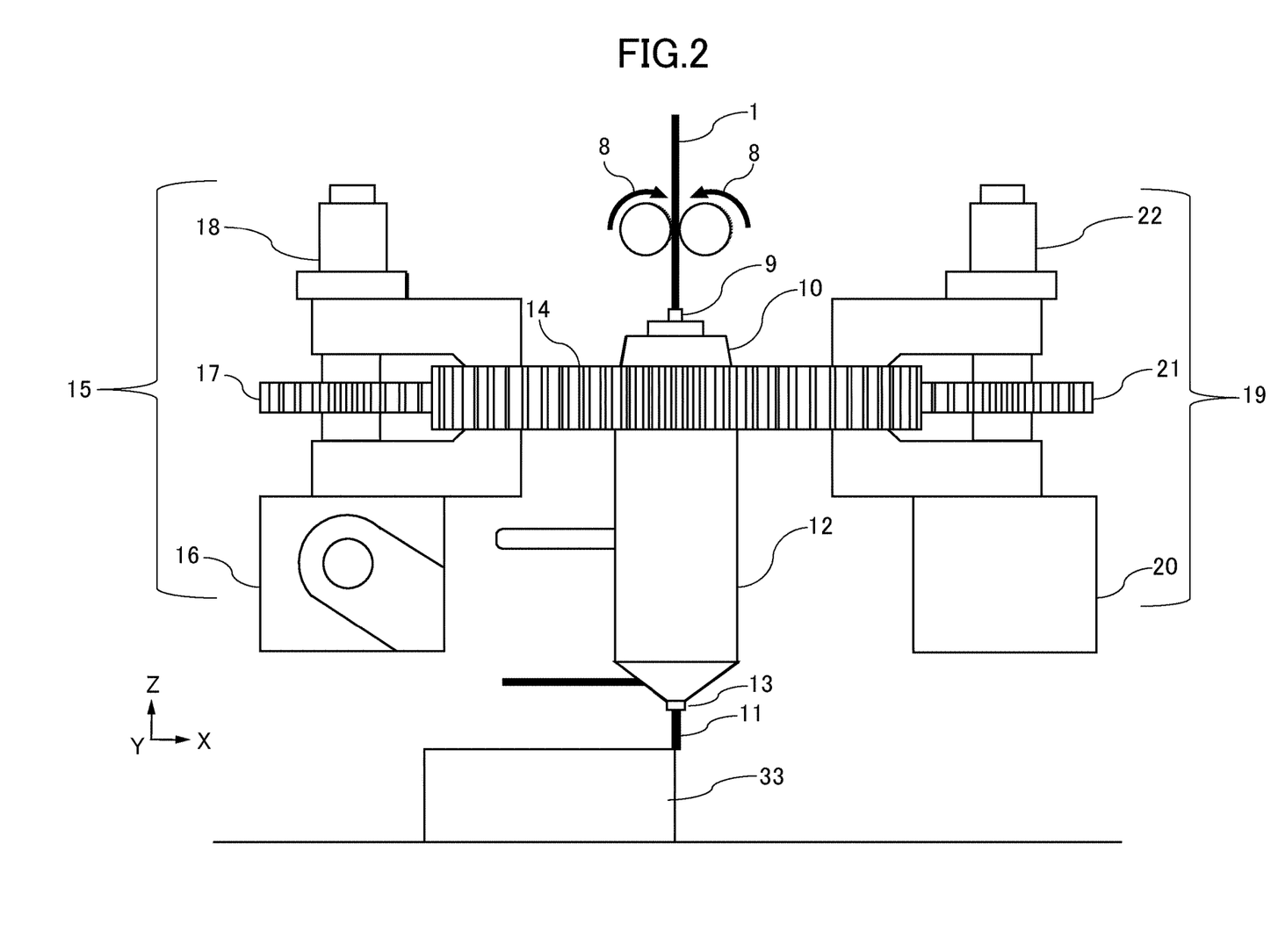
FIG. 2 is a schematic side view for illustrating a configuration of an extruding unit of the first embodiment.

FIG. 2 is a schematic side view for illustrating a configuration of the extruding unit 3. In FIG. 2, the forming material 1 illustrated in FIG. 1, rollers 8, a material introduction portion 9, an extruding head 10, and a molten resin 11 are illustrated. In addition, a heating portion 12, an extruding opening 13, a nonrotary gear 14 mounted on the extruding head 10, a heating unit 15, and a heating means 16 are illustrated. In addition, a gear 17 mounted in the heating unit 15, a motor 18 to rotate the gear 17, a cooling unit 19, a cooling means 20, a gear 21 mounted in the cooling unit 19, and a motor 22 to rotate the gear 21 are illustrated.

The forming material 1 is a raw material used for the additive manufacturing. In the present embodiment, the forming material 1 is a filament of thermoplastic resin. However, another form of material, such as pellet or powder, may be used.

The filament used as the forming material has a circular cross section, for example. Preferably, the filament has a diameter of 1.5 to 3.0 mm, and a length of 10 to 1000 m. The forming material 1 is stored, wound around the reel 2. The forming material 1 can be supplied to the material introduction portion 9 by the reel 2 rotating in a direction indicated by an arrow of FIG. 1.

The thermoplastic resin used in the present embodiment may be a polycarbonate (PC) resin, an acrylonitrile-butadiene-styrene (ABS) copolymer resin, or a PC/ABS polymer alloy. Alternatively, the thermoplastic resin may be a polylactic acid (PLA) resin, a polyphenylene sulfide (PPS) resin, a polyether-imide (PEI) resin, a polyethylene terephthalate (PET) resin, or a resin in which any of the above-described resins is modified.

The extruding head 10 heats and melts the forming material 1 of thermoplastic resin, and extrudes the molten resin 11. The extruding head 10 includes the material introduction portion 9, the heating portion 12, and the extruding opening 13.

The material introduction portion 9 introduces the forming material 1 into the extruding head 10, and one example of the configuration of the material introduction portion 9 is illustrated in FIG. 2. In FIG. 2, the number of the rollers 8 is two.

Thus, the forming material 1 is nipped by the two rollers 8. When the rollers 8 rotate in a direction indicated by arrows of FIG. 2, the filament is drawn and sent from the reel 2 into the heating portion 12.

The amount of supply of the forming material 1 to the heating portion 12 can be adjusted by the control unit 6 controlling the rotational speed of the rollers 8.

Additive Manufacturing Method

Next, an additive manufacturing method of the present embodiment will be described sequentially.

The heating portion 12 includes a heater (not illustrated), and heats and melts the thermoplastic resin supplied through the material introduction portion 9.

The molten thermoplastic resin is delivered to the extruding opening 13 by the following material pushing the molten thermoplastic resin; and extruded, as the molten resin 11, toward a direction opposite to a Z direction in FIG. 2, that is, downward in the vertical direction.

The extruding opening 13 has a diameter of 0.1 to 5 mm. The molten resin 11 is extruded and deposited on the stage 4. The width of the molten resin 11 in a planar direction is controlled by the extruding opening 13, the rollers 8, the heating portion 12, and the stage moving apparatus 5.

The molten resin 11 extruded from the extruding opening 13 forms into a pillar-shaped viscous fluid and moves in the vertical direction, that is, toward the stage 4.

In a step to form a single layer, the shape of the layer in the planar direction is formed by arranging a line of the molten resin 11 and making columns.

In a case where the first layer of a three-dimensionally shaped object 33 is formed, the molten resin 11 contacts the surface of the stage 4. In a case where each of the second and the following layers is formed, the molten resin 11 contacts the surface of a lower layer that has already been formed.

In both cases, after the molten resin 11 contacts the surface of the lower layer, the temperature of the molten resin 11 decreases to a temperature equal to or lower than a glass transition point (Tg) and the molten resin 11 solidifies.

The stage moving apparatus 5 is a mechanism to move the stage 4 in three directions of XYZ, and is controlled by the control unit 6.

An extruding-head moving apparatus (not illustrated) is a mechanism to move the extruding head 10 in the three directions of XYZ, and is controlled by the control unit 6.

When one layer of a three-dimensionally shaped object is formed, the extruding head 10 and the stage 4 scan each other in a relative manner in an XY plane in a state where the distance between the extruding head 10 and the stage 4 is kept constant in the Z direction.

When the next layer is formed, the extruding head 10 and the stage 4 scan each other in a relative manner in an XY plane in a state where the distance between the extruding head 10 and the stage 4 is increased by the thickness of one layer in the Z direction.

For example, when a cylindrical three-dimensionally shaped object is formed, either one of the extruding head 10 and the stage 4 performs a circular motion in an XY plane while the molten resin 11 is being extruded. In addition, the distance between the extruding head 10 and the stage 4 in the Z direction is gradually increased as the number of layers increases.

In the present embodiment, both of the stage moving apparatus 5 and the extruding-head moving apparatus can move in the three directions of XYZ. However, both of the stage moving apparatus 5 and the extruding-head moving apparatus may not necessarily move in the three directions of XYZ, for performing the above-described operations.

For example, the stage moving apparatus 5 may move in two directions of XY, and the extruding-head moving apparatus may move in the Z direction. In another case, one of the stage moving apparatus 5 and the extruding-head moving apparatus may move in the three directions of XYZ, and the other may not move.

With the above-described operations, the molten resin can be deposited for forming a three-dimensionally shaped object. In addition, in the present embodiment, in parallel with the above-described operations, a surface of the object is heated by the heating unit 15, and cooled by the cooling unit 19.

Next, an area to be heated and an area to be cooled will be described with reference to FIGS. 3A, 3B, 4, and 5. These figures are schematic plan views in which a three-dimensionally shaped object that is being formed is viewed from above.

Figure 3A:
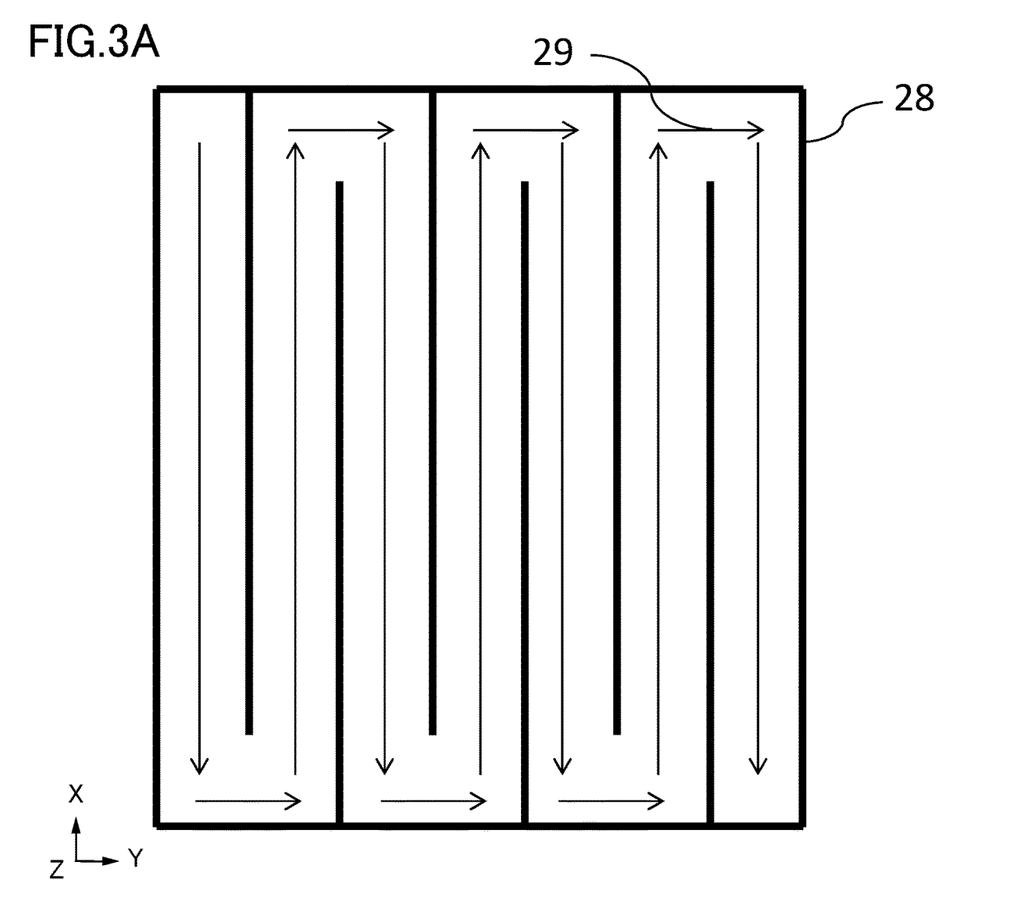
FIG. 3A is a schematic plan view of the (N−1)th layer in a case where the Nth layer is currently being formed.
Figure 3B:
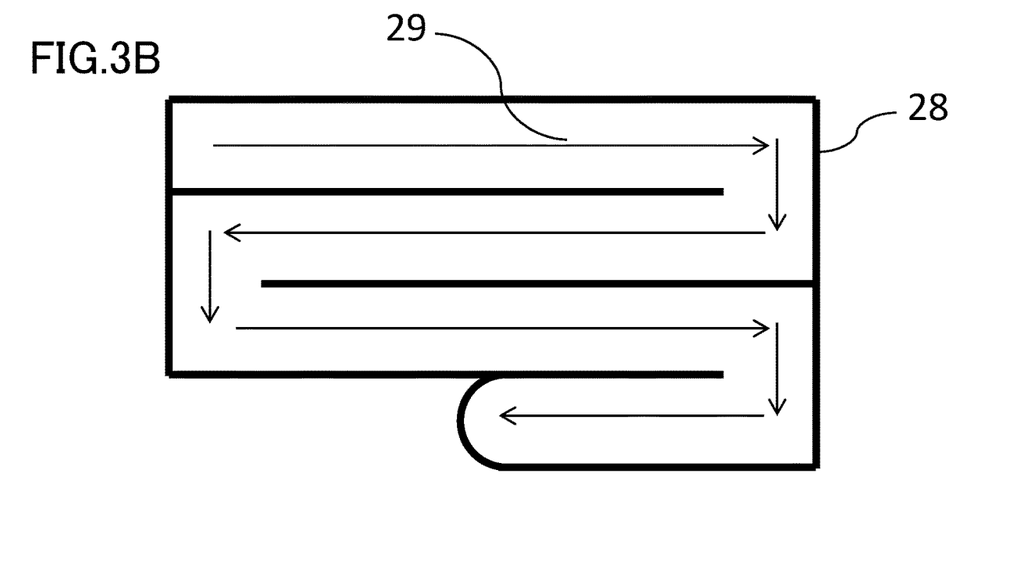
FIG. 3B is a schematic plan view of the Nth layer alone that is currently being formed.

FIG. 3A is a schematic plan view of the (N−1)th layer in a case where the Nth layer is currently being formed. FIG. 3B is a schematic plan view of the Nth layer alone that is currently being formed. In the figures, a line 28 denotes a boundary between columns of extruded resin, and an arrow 29 denotes a trajectory (trace of movement) of the extruding opening in the layer.

In general, an angle of columns of the molten resin 11 is changed for each layer in a plan view so that the three-dimensionally shaped object does not have anisotropy in strength. In the present embodiment, the angle of columns of one layer is shifted by 90 degrees in a plan view with respect to the angle of columns of an adjacent layer.

Figure 4:
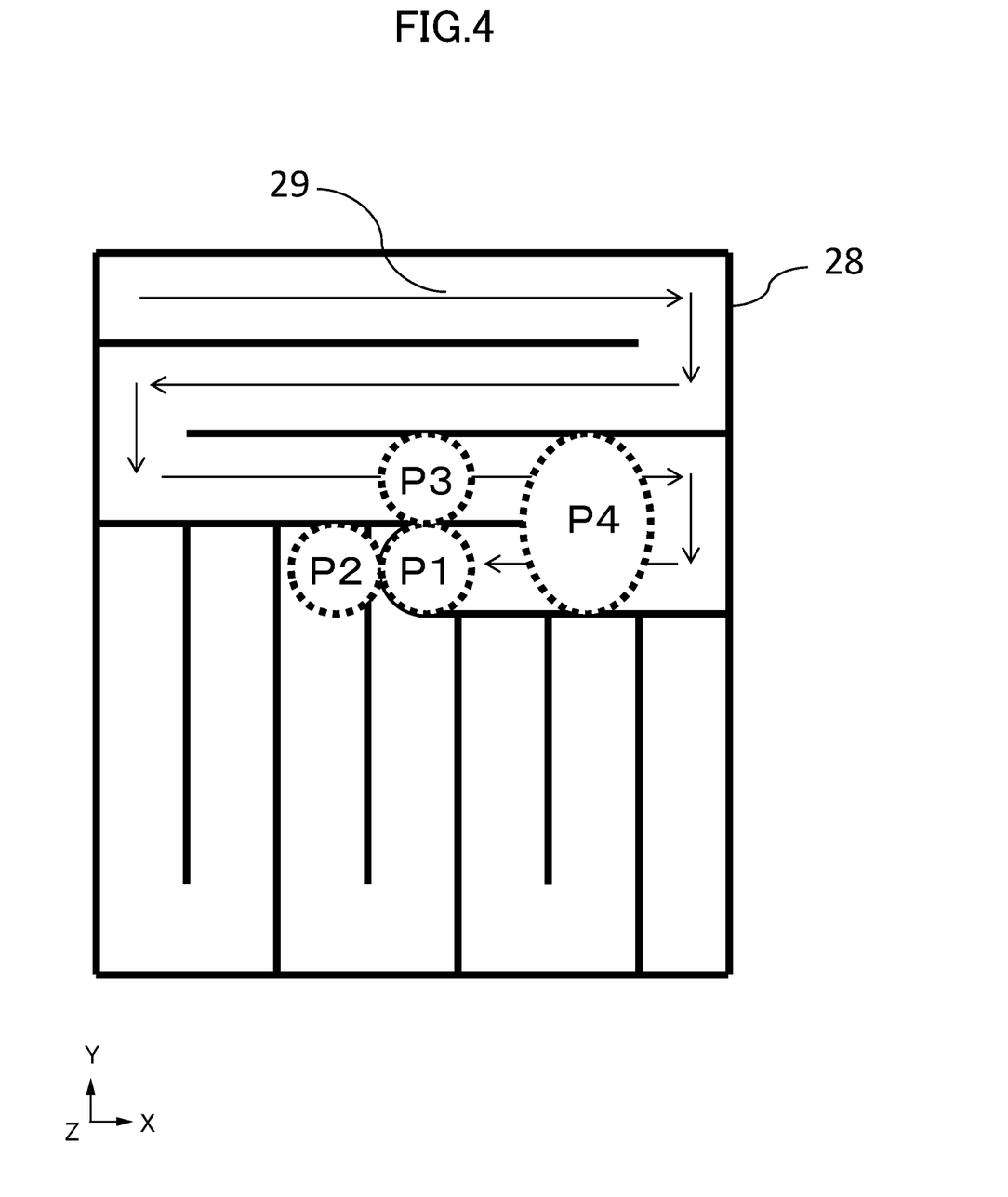
FIG. 4 is a schematic plan view for illustrating an extrusion position, heating, and cooling in the formation of the Nth layer.
Figure 5:
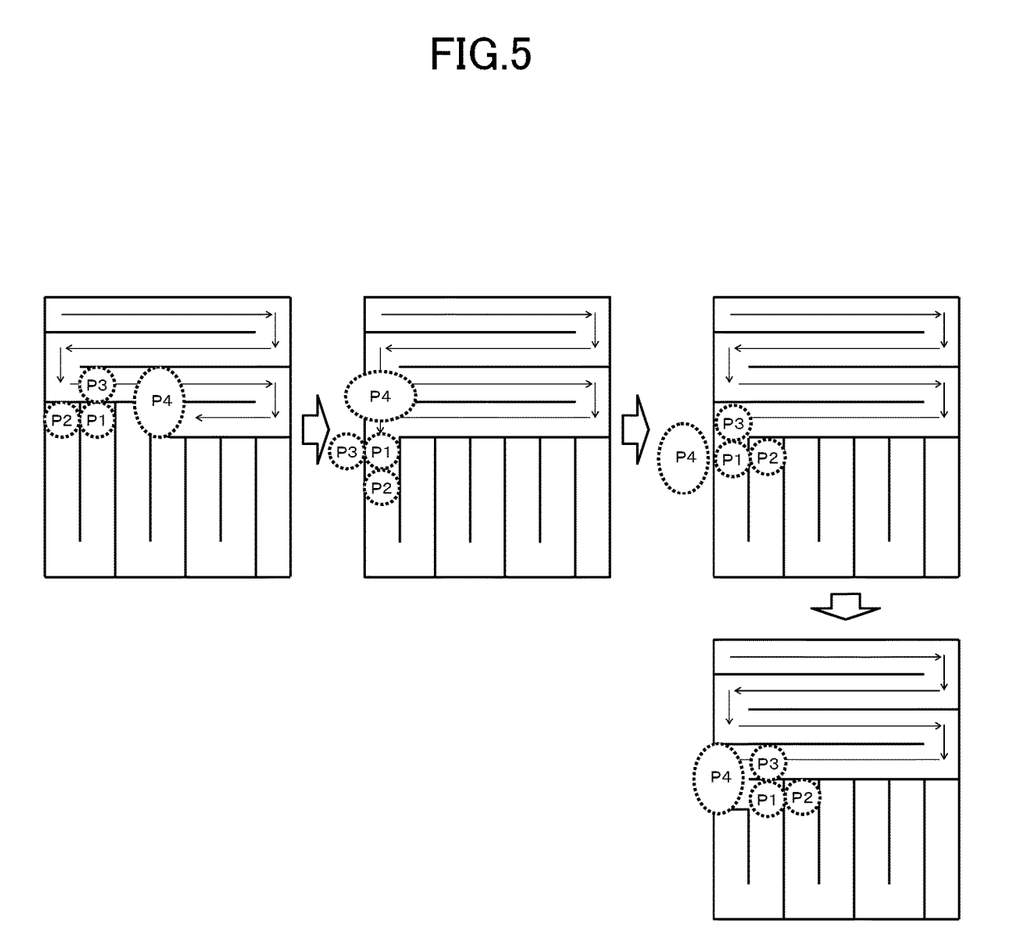
FIG. 5 is a schematic diagram illustrating an extrusion position, heating, and cooling at a turning point of a trajectory in each stage of the formation of the Nth layer.

FIG. 4 is a schematic plan view for illustrating an extrusion position, heating, and cooling in the formation of the Nth layer. FIG. 5 is a schematic diagram illustrating an extrusion position, heating, and cooling at a turning point of a trajectory in each stage of the formation of the Nth layer.

An area P1 is an area to which the molten resin 11 extruded from the extruding opening 13 of FIG. 2 contacts (that is, an area on which the molten resin 11 is deposited). An area P2 is an area to be heated that is located in a direction in which the area P1 moves relative to the stage 4. An area P3 is an area to be heated that is located beside the area P1. An area P4 is an area to be cooled that is located behind the area P1 in the direction.

The heating unit 15 reheats the areas P2 and P3 of resin solidified on the stage 4. The area P2 is an area of the (N−1)th layer of resin in a case where the Nth layer is currently being formed, and is reheated for increasing the adhesion strength between the Nth layer and the (N−1)th layer. The area P3 is an area of the (M−1)th column in a case where the Mth column of the Nth layer is currently being formed, and is located beside the area P1. The area P3 is reheated for increasing the adhesion strength between adjacent columns, and thus for increasing the strength of the Nth layer. Preferably, the width of the area P3 is smaller than the width of the molten resin 11. This is because if the area P3 whose width is equal to or larger than the width of the molten resin 11 (that is extruded to the area P1 and deposited) is heated, columns other than the (M−1)th column may be heated, and a desired shape may be deformed. In addition, the heating is performed locally such that the temperature of a lower layer that has already been formed is equal to or higher than a glass transition temperature of the thermoplastic resin and lower than a glass transition temperature added by 30° C.

In addition, when the area P2 is located at a position at which the distance between the edge of the three-dimensionally shaped object and the area P2 is smaller than the width of the extruded resin, or the area P3 is located at a position at which the distance between the edge of the three-dimensionally shaped object and the area P3 is smaller than the width of the extruded resin, that is, when the outer edge portion (outermost portion) of the three-dimensionally shaped object and its vicinity are heated, the output power of the heating means is reduced for preventing deterioration of the accuracy in shape of the three-dimensionally shaped object, caused by excessive heating.

The cooling unit 19 locally cools the area P4 immediately after the molten resin is deposited on the area P4, and speeds up the solidification of the molten resin for increasing stability in shape and size.

Next, a method and a mechanism of heating and cooling the resin formed on the stage will be described in detail.

A driving mechanism keeps a relative distance between the heating unit 15 and the extruding head 10 and a relative distance between the cooling unit 19 and the extruding head 10; and keeps a relative position of the heating unit 15 with respect to the extruding head 10 and a relative position of the cooling unit 19 with respect to the extruding head 10, while the extruding head 10 is scanning.

In the present embodiment, the nonrotary gear 14, the gear 17 mounted in the heating unit 15, and the motor 18 that transmits power to the gear 17 are provided. The nonrotary gear 14 is mounted on the extruding head 10 such that the central axis of the nonrotary gear 14 is equal to the central axis of the extruding head 10. In addition, the gear 21 mounted in the cooling unit 19, and the motor 22 that transmits power to the gear 21 are provided. The gears 17 and 21 mesh with the gear 14. Thus, when the gears 17 and 21 rotate, they pivot on the gear 14.

Although the gears that pivot on the extruding head 10 are used as the driving mechanism in the present embodiment, another mechanism such as a disk or a robot arm may be used as long as the mechanism can keep the relative distance between the extruding head 10 and the heating unit 15 and the relative distance between the extruding head 10 and the cooling unit 19, and the relative position of the heating unit 15 with respect to the extruding head 10 and the relative position of the cooling unit 19 with respect to the extruding head 10.

The heating unit 15 heats the area of the resin located in the direction toward which the extruding opening moves with respect to the stage, and the area of the resin located beside the extruding opening. The resin of the areas has been extruded from the extruding opening, and cooled and solidified by the outside air. Preferably, the heating means of the heating unit 15 has a short startup time for the heating. This is because if the time in which the temperature of the solidified material rises to a target temperature is long, the extruding head have to move at slow speed to wait the rise of temperature of the solidified material, possibly causing the forming time to increase.

In addition, if another approach that cannot locally heat the area is used, another area of the solidified material other than the desired area will be heated. As a result, the viscosity of the solidified forming material will decrease, possibly deforming the shape of the object.

Thus, it is preferable that the heating means can start the heating in a short startup time, and locally heat the area. For example, the heating means may be a laser or a near-infrared heater with a condensing or masking function.

For heating the front area and the side area, a plurality of heating means may be used. However, for preventing the apparatus from being upsized, it is preferable that a single heating means be used to limit or control areas to be heated.

In the present embodiment, a heat-condensing near-infrared heater is used. The heat source of the heater is a half-ring-shaped halogen lamp, and the heat from the heat source is condensed and shielded so that the heat is applied to a semicircle focal point whose diameter is equal to or smaller than three times the diameter of the molten resin deposited in the planar direction.

The cooling unit 19 cools the resin that has been extruded from the extruding opening.

Preferably, the cooling unit 19 uses a cooling means that cools the resin in a noncontact manner. This is because if the cooling means contacts the forming material in the cooling, the forming material will adhere to the cooling unit, and may cause trouble in the forming operation. Thus, in the present embodiment, a fan is used to send cool air.

The control unit controls the operation of the driving means, and thereby controls the position of the heating unit 15 so that the heating unit 15 is located in front of the extruding head 10. In the sequence control, since the difference between the position of the heating unit 15 determined in the system and the actual position of the heating unit 15 may be accumulated, correction (calibration) is performed regularly for correcting the difference. Thus, in the present embodiment, feedback-control is performed by using an absolute encoder.

Configuration of Control Unit

The control unit 6 is a control circuit for controlling each unit of the additive manufacturing apparatus.

The control unit 6 includes a CPU, a ROM, a RAM, and an I/O port. The ROM is a nonvolatile memory that stores a control program and a control numerical table. The RAM is a volatile memory used for computation or the like. The I/O port is used for communicating with a device located outside the apparatus and each component of the apparatus.

Note that the ROM stores a program used for controlling a basic operation of the additive manufacturing apparatus.

The computer 7 is an electronic computer including a storage device, a computing device, and an input/output device; and can execute a three-dimensional shape editing program. The computer 7 creates a multilayer model, depending on the information on a three-dimensional model to be formed. The multilayer model is a model suitable to form by using the extruding head. The computer 7 sends instructions to the control unit 6 for sequentially forming layers of the model.

The computer 7 may be a computer included in the additive manufacturing apparatus, or may be an external computer that can be connected with the additive manufacturing apparatus via a network or the like.

Figure 6:
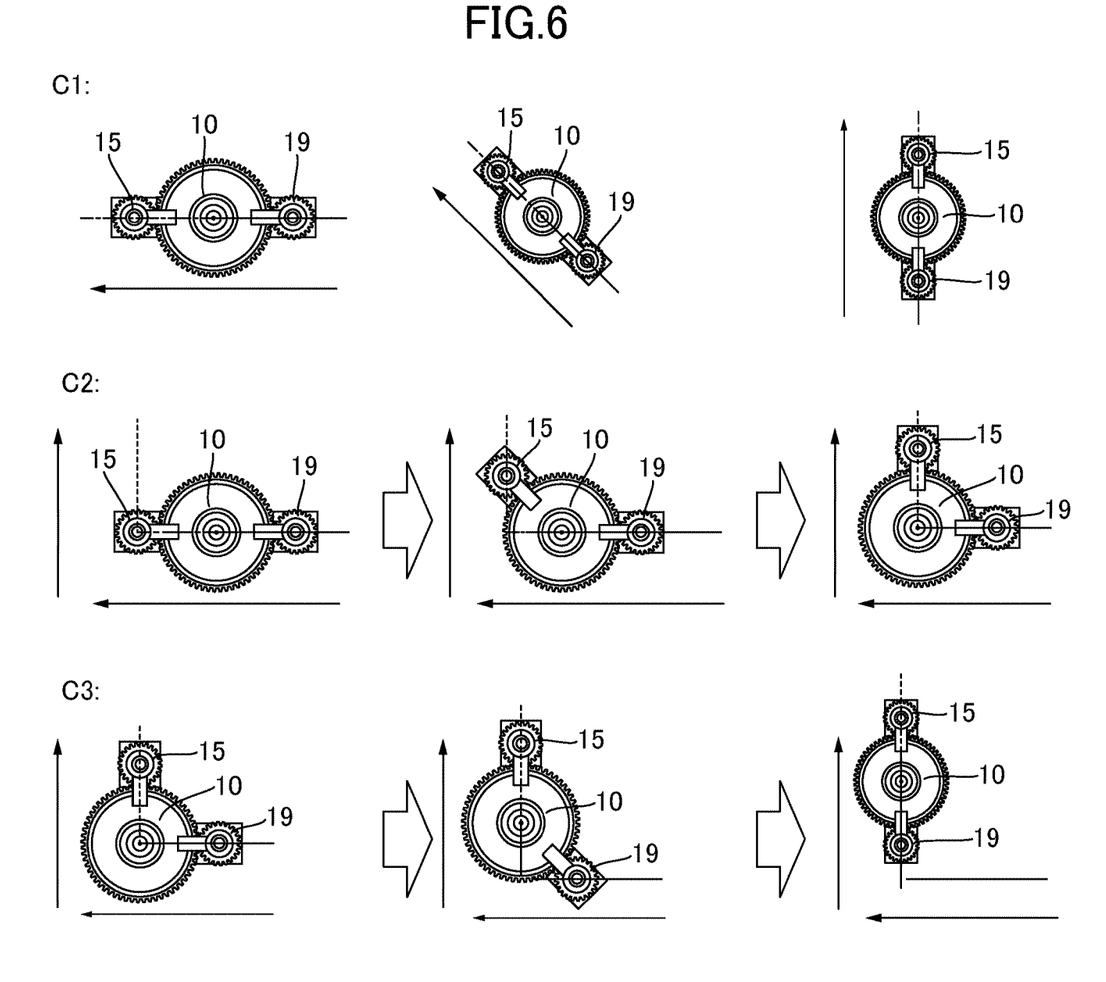
FIG. 6 is a diagram for illustrating detailed operations of a heating unit and a cooling unit of the first embodiment.

Next, with reference to FIG. 6, forming operations of the heating unit 15 and the cooling unit 19 in the present embodiment will be described in detail.

In an operation C1 to form a straight portion, the gear 17 mounted in the heating unit 15 and the gear 21 mounted in the cooling unit 19 are moved so that the heating unit 15, the extruding head 10, and the cooling unit 19 are arranged upstream in this order in the moving direction of the stage 4 (in parallel with the moving direction of the stage 4). While such an operation is performed, the molten resin 11 is extruded from the extruding opening 13.

In an operation C2 to form a curved portion, when the heating unit 15 is reaching a turning point at which the moving direction of the stage 4 changes, the relative angle of the heating unit 15 to the extruding head 10 is changed so that the next area that the extruding head 10 will pass is heated. In the operation C2, the gear 17 mounted in the heating unit 15 is rotated by the motor 18, and thereby pivoted on the nonrotary gear 14 mounted on the extruding head 10.

In an operation C3 to form a curved portion, when the extruding head 10 is reaching a turning point at which the moving direction of the stage 4 changes, the relative angle of the cooling unit 19 to the extruding head 10 is changed so that the area that the extruding head 10 has passed is cooled.

In the operation C3, the gear 21 mounted in the cooling unit 19 is rotated by the motor 22, and thereby pivoted on the nonrotary gear 14 mounted on the extruding head 10.

In the operations C1 and C3, if the turning point has an angle (40 degrees or less in the present embodiment) that causes the cooling unit 19 to interfere with the heating unit 15, the cooling fan is positioned at a position at which the cooling unit 19 does not interfere with the heating unit 15, to give priority to the operation C2.

In this manner, the three-dimensionally shaped object is formed by forming a planar shape by using the operations C1, C2, and C3, then lowering the stage by the thickness of one layer, and then repeating the above-described operations.

Configuration of Control Blocks

Figure 7:
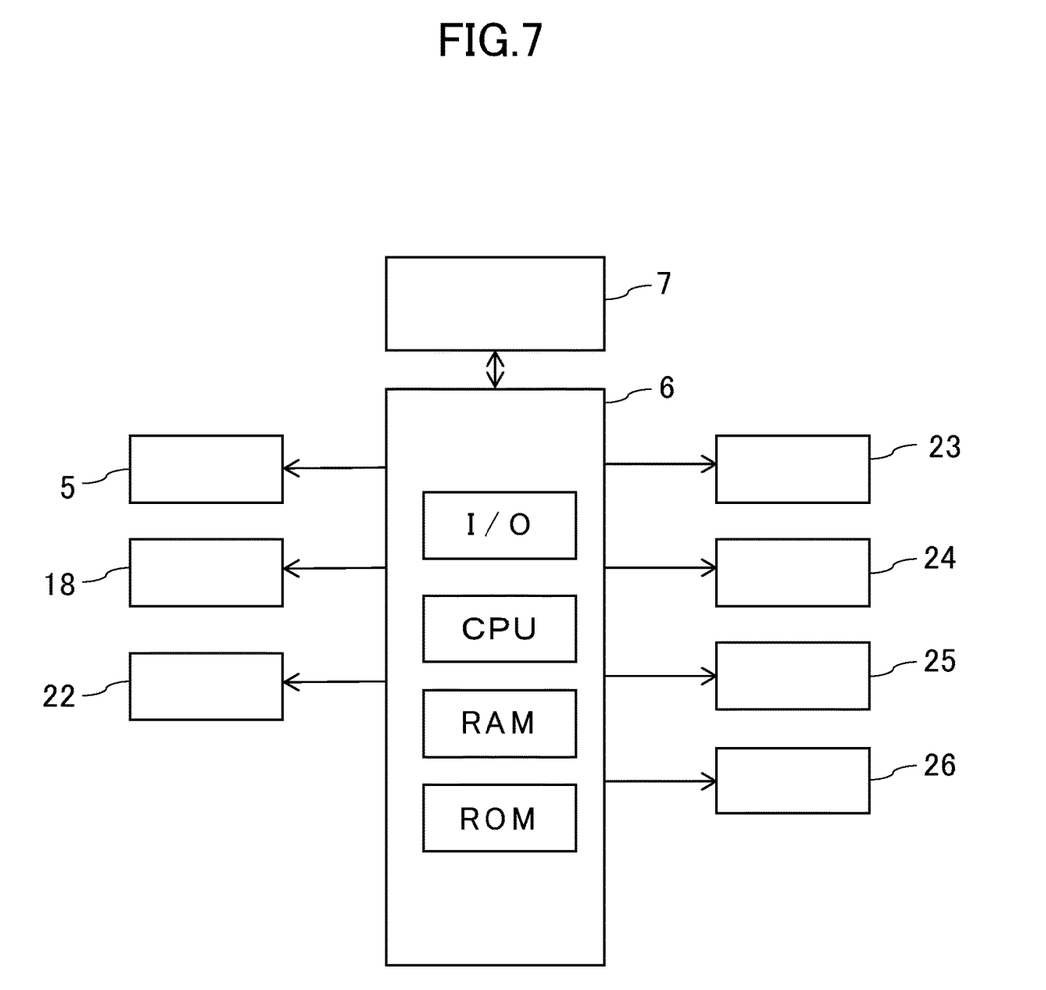
FIG. 7 is a control block diagram of an additive manufacturing apparatus of the first embodiment.

Next, with reference to FIG. 7, a configuration of control blocks of the additive manufacturing apparatus of the present embodiment will be described. FIG. 7 is a simplified block diagram illustrating a relationship of connection of control lines for components of the apparatus. In FIG. 7, the stage moving apparatus 5, the computer 7, the motor 18, the motor 22, a roller driving unit 23, and an extruding-head moving apparatus 24 (not illustrated in FIG. 1) are provided. The motor 18 is illustrated in FIG. 2, and used for rotating the gear 17. The motor 22 rotates the gear 21. In addition, a heater driving unit 25, and a cooler driving unit 26 are provided.

Functions of the stage moving apparatus 5, the extruding-head moving apparatus 24, the control unit 6, and the computer 7 are as descried above.

The roller driving unit 23 is a circuit to drive the two rollers 8 disposed adjacent to the material introduction portion 9 of the extruding head 10, and includes a circuit to receive a driving command from the control unit 6 and a driver circuit to drive a roller driving motor.

The heater driving unit 25 is a circuit to drive a heater included in the heating portion 12 of the extruding head 10 and the heating means 16 of the heating unit 15, and includes a heater power source, an energization control circuit, and a circuit to receive a heating command from the control unit 6.

The cooler driving unit 26 is a circuit to drive the cooling means 20 of the cooling unit 19, and includes an air-blowing power source, an energization control circuit, and a circuit to receive a cooling command from the control unit 6.

Additive Manufacturing Process

Figure 8:
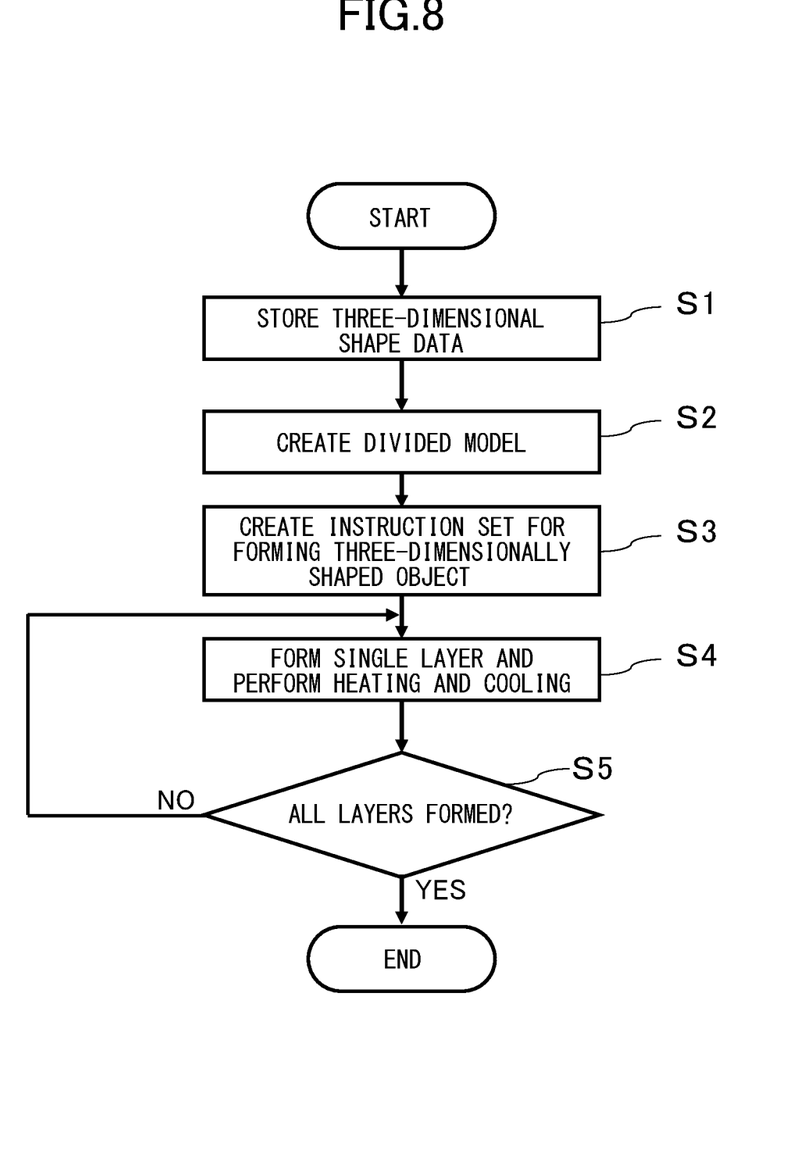
FIG. 8 is a flowchart illustrating a sequence of steps of an additive manufacturing method of the first embodiment.

Next, an additive manufacturing process of the present embodiment will be described sequentially. FIG. 8 is a flowchart illustrating a sequence of steps of an additive manufacturing process of the present embodiment.

In Step S1, three-dimensional shape data of a three-dimensional model to be formed is stored in the computer 7. The three-dimensional shape data may be created by the computer 7, or may be created by using CAD or a three-dimensional shape measurement instrument and sent to the computer 7 via a network or a storage medium. The three-dimensional shape data format may be the STEP format, the Parasolid format, or the STL format, but may be another format as long as the other format can express the three-dimensional shape by using digital data.

In Step S2, the computer 7 creates shape data of each layer from the three-dimensional shape data. The shape data of each layer is used when the three-dimensional model is formed by placing one layer on top of another. In Step S2, the computer 7 uses a computing device included in the computer 7 and a three-dimensional shape editing program, and creates a divided model obtained by dividing the three-dimensional model. The thickness of the divided model is a thickness of one layer that the additive manufacturing apparatus of the present embodiment can place on top of another.

Figure 9:
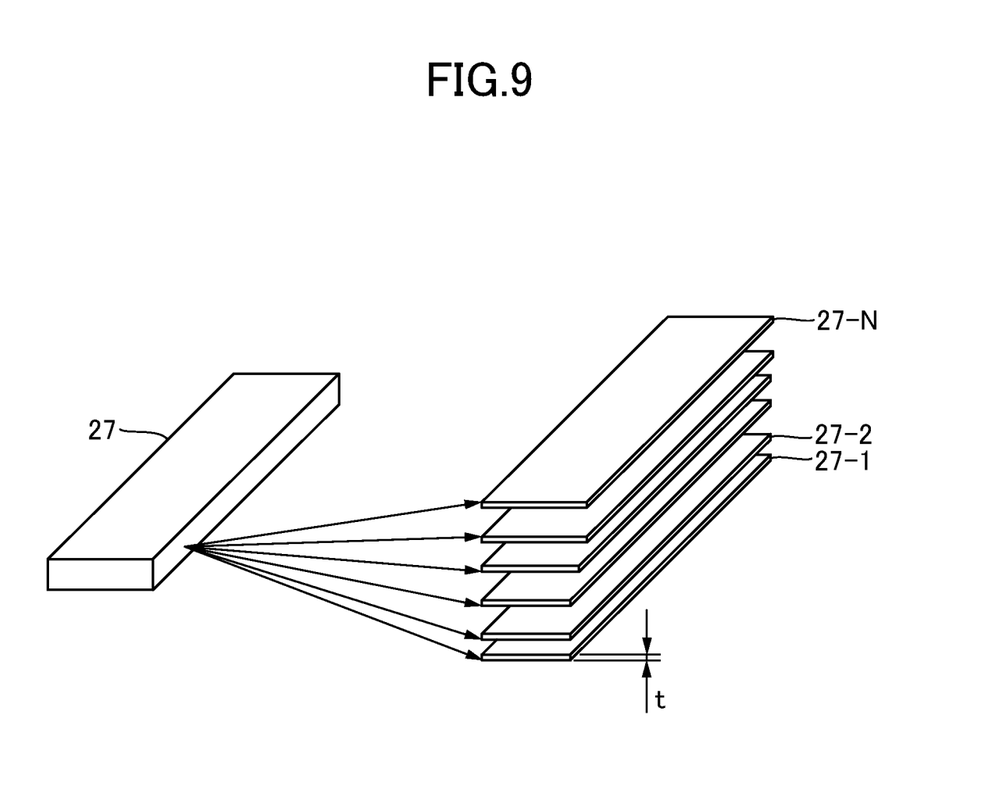
FIG. 9 is a diagram for illustrating a slice model of each layer.

For example, as illustrated in FIG. 9, if the three-dimensional model to be formed is a rectangular parallelepiped 27, the three-dimensional model is divided into slice models each having a thickness of t. The thickness t is a thickness of one layer that the additive manufacturing apparatus can place on top of another. For convenience of description, in the present embodiment, the three-dimensional model is divided into N layers. Thus, the slice models are a layer 27-1, a layer 27-2, . . . , and a layer 27-N, arranged upward in this order in the vertical direction.

In Step S3, the computer 7 creates an instruction set necessary for the additive manufacturing apparatus to form the three-dimensional model, in accordance with the divided model created in Step S2; and sends the instruction set to the control unit 6. Note that the computer 7 may send the divided model to the control unit 6, and the control unit 6 may create the instruction set necessary for forming the three-dimensional model. The instruction set includes procedure for forming the first to the Nth layers stacked one after another, and instructions related to areas to be heated and cooled.

In Step S4, the control unit 6 operates each component of the apparatus and performs the formation of a single layer, the heating, and the cooling, in accordance with the instruction set. The operations in Step S4 are as described above. In Step S4, the divided model created in Step S2 is three-dimensionally formed as one layer.

In Step S5, the control unit 6 determines whether the whole of N number of primary divided models is three-dimensionally formed. Then the control unit 6 executes Step S4 again if the whole of the divided models is not formed, or ends the additive manufacturing if the whole of the divided models is formed.

The present embodiment can form a three-dimensionally shaped object having high strength in the planar direction and the deposition direction and high shape stability, compared to conventional methods in which the heating and the cooling are not performed.

Second Embodiment

Hereinafter, a second embodiment will be described with reference to the accompanying drawings. The present embodiment differs from the first embodiment in configuration and operation of the extruding unit 3. Thus, the description for a component identical to a component of the first embodiment will be omitted.

Figure 10A:
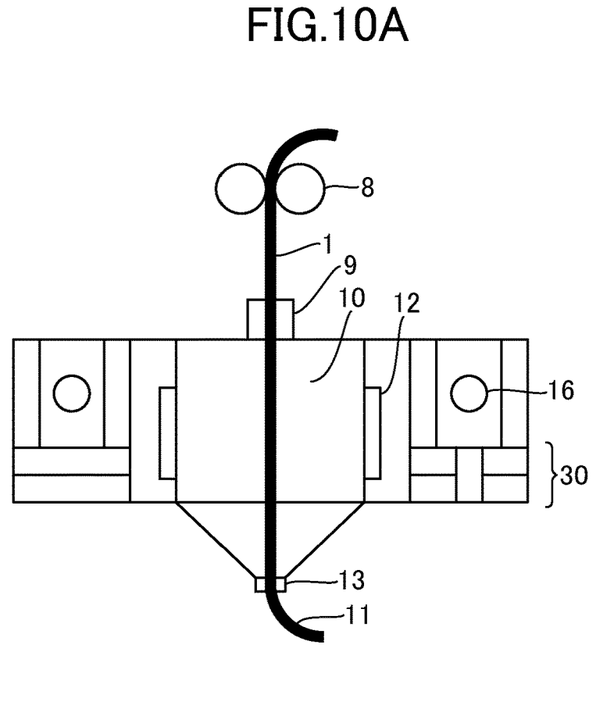
FIG. 10A is a diagram illustrating a configuration of an extruding unit of a second embodiment.
Figure 10B:
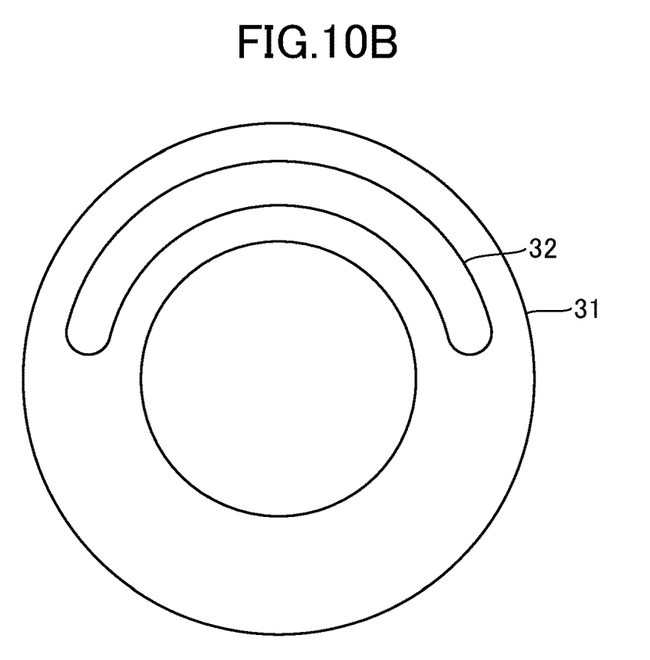
FIG. 10B is a diagram illustrating a configuration of a valve of the second embodiment.

A configuration of the extruding unit of the present embodiment will be described with reference to FIGS. 10A and 10B. In the present embodiment, as illustrated in FIG. 10A, one or more heating means are disposed on a circle around the extruding head 10, and valves 30 corresponding to the respective heating means are disposed. Thus, when an area to be heated on a top surface on which the deposition is performed is changed in accordance with the forming operation, and when the output power is changed, the valves 30 are opened or closed.

In a first specific example of the second embodiment, a ring-type halogen lamp is used as the heating means 16. FIG. 10B illustrates a planar shape of each valve 30. As illustrated in FIG. 10B, the valve 30 includes a round plate 31 that has an arch-shaped long hole 32 formed on a circle around the extruding head 10. Specifically, the valve 30 is constituted by two round plates 31, and the two plates 31 are completely overlapped with each other such that each plate can rotate independently around the extruding head 10. Since each of the two round plates 31 is rotated in accordance with the forming operation, the position at which the arch-shaped long holes 32 overlap with each other can be controlled. With this control, the shape and position of an opening through which the near-infrared light from the halogen lamp passes are changed, and thereby the area to be locally heated on a surface on which the forming operation is performed is changed.

In a second specific example of the second embodiment, eight hot-air torches are used as the heating means 16. The eight hot-air torches are disposed at regular intervals on a circle around the extruding head 10, and on-off valves are attached to the corresponding hot-air torches. By operating the on-off valves, the area to be heated on a surface on which the forming operation is performed is changed.

In the present embodiment, since a valve is provided for each of the heating means for controlling the local heating, the position of the area to be locally heated and the amount of heat can be precisely controlled. Thus, the present embodiment can form a three-dimensionally shaped object having high strength in the planar direction and the deposition direction and high shape stability.

The present invention can also be embodied by supplying a program that achieves one or more functions of the above-described embodiments, to a system or a device via a network or a storage media, and by causing one or more processors of a computer of the system or the device to read and execute the program. In addition, the present disclosure may be embodied by a circuit (such as an ASIC) that achieves one or more functions.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-217176, filed Nov. 29, 2019, which is hereby incorporated by reference herein in its entirety.

What is claimed is:

1. A method of manufacturing a three-dimensionally shaped object, the method comprising:

heating and melting thermoplastic resin to form molten thermoplastic resin;

repeating stacking of layers of solidified thermoplastic resin that is formed by moving a nozzle and extruding the molten thermoplastic resin from the nozzle; and solidifying extruded thermoplastic resin, wherein the layers include a first layer and a second layer on the first layer, wherein a first area is located on the first layer, a second area and a third area located on the second layer so that a first direction in which the nozzle is arranged between the first area and the third area in a plan view is orthogonal to a second direction in which the second area and the nozzle are arranged in the plan view, and the first, second, and third areas include portions at equal distances from the nozzle, and wherein, in forming the second layer, locally heating the solidified thermoplastic resin that has already been formed while moving the nozzle, by selectively irradiating with light the first area and the second area of the solidified thermoplastic resin, and locally cooling the molten thermoplastic resin that has already been deposited while moving the nozzle, by selectively sending air by a fan to the third area.

2. The method according to claim 1, wherein a width of the second area is smaller than a width of the molten thermoplastic resin extruded from the nozzle.

3. The method according to claim 1, wherein the first area is locally heated such that a temperature of the first area is from a glass transition temperature of the thermoplastic resin to the glass transition temperature plus 30° C.

4. The method according to claim 1, wherein each of the layers of the solidified thermoplastic resin is formed by making columns of thermoplastic resin, and wherein, when the nozzle extrudes the molten thermoplastic resin to make an $M^{th}$ column of an $N^{th}$ layer, the second area is located on an M−1 column of the $N^{th}$ layer in the plan view.

5. The method according to claim 1, wherein the light is near-infrared light.

6. The method according to claim 1, wherein the light is a laser beam.

7. The method according to claim 1, wherein before the locally heating the second area, a temperature of the second area decreases to a temperature equal to or lower than a glass transition temperature of the thermoplastic resin.

8. The method according to claim 1, wherein the first area is located in front of the nozzle in a moving direction of the nozzle in the plan view.

* * * * *